Sept. 20, 1966        J. F. LOUIS        3,274,408
HIGH TEMPERATURE ANISOTROPIC NONCONSUMABLE ELECTRODE
Filed May 14, 1963

JEAN F. LOUIS
*INVENTOR.*

BY Alden D. Redfield
Melvin E. Frederick
ATTORNEYS

United States Patent Office 3,274,408
Patented Sept. 20, 1966

3,274,408
HIGH TEMPERATURE ANISOTROPIC
NONCONSUMABLE ELECTRODE
Jean F. Louis, Brookline, Mass., assignor to Avco Corporation, Cincinnati, Ohio, a corporation of Delaware
Filed May 14, 1963, Ser. No. 280,273
13 Claims. (Cl. 310—11)

The present invention relates generally to magnetohydrodynamic (hereinafter referred to as "MHD") devices employing a hot electrically-conductive fluid or plasma, and more particularly to improved electrodes for use in such devices.

MHD generators produce electric power by movement of electrically-conductive fluid or plasma relative to a magnetic field. The plasma employed is usually an electrically-conductive gas from a high temperature, high pressure source. From the source, the plasma flows through the generator and by virtue of its movement relative to the magnetic field, induces an electromotive force between opposed electrodes within the generator. The gas comprising the plasma may exhaust to a sink which may simply be the atmosphere; or, in more sophisticated systems, the gas may exhaust to a recovery system including pumping means for returning the gas to the source. Conductivity of the gas may be produced thermally and/or by seeding with a substance that ionizes readily at the operating temperature of the generator. For seeding purposes, sodium, potassium, cesium or an alkali metal vapor may be used. Regardless of the gas used, or the manner of seeding, the resulting gases comprise a mixture of electrons, positive ions, and neutral atoms which, for convenience, is termed "plasma."

An MHD generator of the type described normally employs a stationary magnetic field and unidirectional gas flow. As a result, such a generator is inherently a source of direct current. If alternating current is desired, some form of auxiliary equipment is usually provided to invert the direct current to alternating current.

MHD pumps use the induction motor principle, i.e., a conductive liquid is considered to be a wire or conductor suspended in a magnetic field and has a current passed through it mutually perpendicular to the length of the conductor and the magnetic field. Under these conditions, a force is induced in the conductor which tends to move it in a direction which is mutually perpendicular to the current and magnetic flux. This force, when applied to a liquid conductor, propels the liquid conductor in the same manner as a conventional pump. Such pumps have become quite common in laboratory work and in connection with the movement of liquid sodium and liquid sodium-potassium in nuclear reactors. Electrodes for passing electric current through the liquid conductor within the magnetic field are located in what is generally referred to as the throat of the pump.

MHD accelerators are constructed and operate in substantially the same manner as MHD pumps, the difference being that whereas MHD pumps are generally used for pumping liquids, MHD accelerators are generally used for accelerating an electrically-conductive gas.

In accordance with the present invention, there is provided an essentially nonconsumable electrode for use in an electrically-conductive plasma at the temperatures of products of combustion. The extreme end of the electrode in contact with the plasma is comprised of a metallic material provided with a plurality of recesses in which is fixedly disposed a high temperature material, preferably a ceramic, that is electron emissive. The aforementioned metallic material and the high temperature material in contact with the plasma are preferably erosion resistant to and retain their integrity at temperatures of the products of combustion, the recesses being provided so that the metallic material bears the shear stresses due to gas friction which the electron emissive material would not be able to withstand. Cooling of the electrode permits a low temperature bond at the interface between the electron emissive and metallic portions of the electrode, although the strength of the bond may be enhanced by the presence of any suitable third material. This construction provides a very low electrical resistance path to the surface of the electrode although the low resistance path in the high temperature material exists only at the surface where the material reaches high temperatures and electrical conductivity as a result of heating by the plasma. Further, because of the substantial difference in temperature that is made possible in accordance with the present invention between the electron emissive and metallic portions of the electrode, arcing due to the Hall effect between adjacent electrodes, which is often present in MHD devices, is at least reduced if not eliminated. Such arcing is undesirable because of the resultant erosion of the electrodes and/or surrounding electrical insulation.

It is therefore a principal object of the present invention to improve the performance of electrodes in MHD devices.

It is another object of the present invention to provide an essentially nonconsumable electrode for MHD devices.

It is a further object of the present invention to provide an electrode for operation in a high temperature and oxidizing atmosphere.

It is a still further object of the present invention to provide an electrode for use in MHD generators and accelerators which reduces the Joule losses in the boundary layer.

The novel features that are considered characteristic of the present invention are set forth in the appended claims; the invention itself, however, both as to its organization and method of operation, together with additional objects and advantages thereof, will best be understood from the following description of the specific embodiment when read in conjunction with the accompanying drawings, in which:

Figure 1:
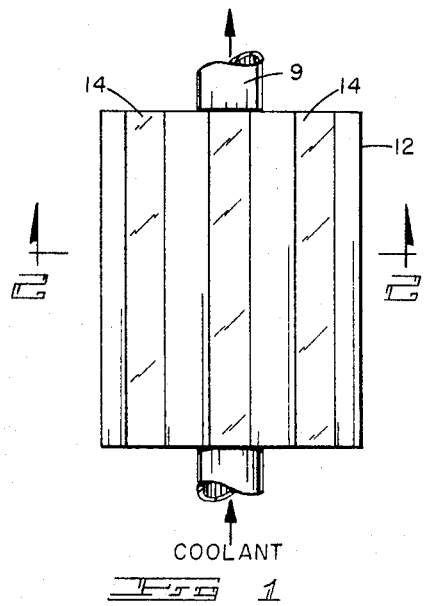
FIGURE 1 is a top view of an electrode in accordance with the invention.
Figure 2:
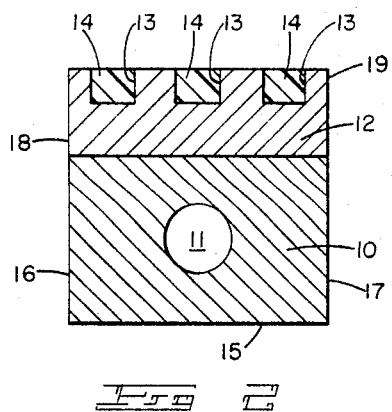
FIGURE 2 is taken on line 2—2 of FIGURE 1.

Attention is now directed to FIGURE 1 and FIGURE 2 which illustrate an electrode constructed in accordance with the present invention. As shown in these figures, the electrode may be comprised of a metallic base portion 10 such as, for example, copper provided with a passage 11 to receive a coolant via pipes 9, an end portion 12 composed of, for example, stainless steel provided with a plurality of grooves or recesses 13 extending over the length of the electrode. Each groove or recess 13 is filled with an electron emitting material 14 more fully described below.

When mounted in an MHD device, the electrodes must of course be electrically insulated to prevent short circuiting. Since the insulation is generally provided separately from the electrode, it is not shown. However, if desired, the sides and bottom of the metallic portion of the electrode may be covered by any suitable insulating material. Generally, Teflon or the like is provided at the bottom surface 15 and at the portions 16 and 17 of the sides adjacent the bottom surface 15 and an electrically insulating refractory material is provided at the upper portions 18 and 19 of the sides of the electrode.

Present day electrically-conductive gases or plasmas used in MHD devices are either noble gases heated to a temperature of at least 2000° F. or more, or products of combustion at a temperature of about 5000° F. Accordingly, an electrode in accordance with the present invention intended for use in MHD devices in any event must be exposed to temperatures in excess of 2000° F.

that may vary over a considerable range and most likely exposed to a corrosive and/or oxidizing plasma. Under these conditions, it has been found that a ceramic material doped with an electrically emissive material is most suitable.

While the present invention is not limited to the use of a ceramic material, it will be so described for convenience and by way of example. Thus, whether of a ceramic nature or not, the material deposited in grooves 13 should not be oxidizable when exposed to the electrically-conductive gas; it should have a low coefficient of expansion to prevent or at least minimize cracking, spalling and the like, and it should be electron emissive.

The thermal emission of current by an electrode of the type here concerned is an exponential function of temperature. Thus, for a given electrically-conductive gas or plasma and electrode design, the temperature of the exposed surface of the electrode depends on the gas temperature in the boundary layer and since the conductivity of gases is strongly dependent on temperature, the Joule dissipation in the bounary layer is dependent on the temperature of the boundary layer. Further, for many applications, the electrically-conductive gas used in MHD devices oxidizes and, therefore, consumes electrode refractory materials such as carbon, tungsten, molybdenum, columbium and the like.

In accordance with the present invention, a ceramic material that has been found satisfactory is described in an article entitled "Properties and High Temperature Applications of Zirconium Oxide" in Ceramic Age, June 1962. This material is zirconium oxide with about 6.4% calcium oxide. While such a material serves equally as well in an inert atmosphere as in an oxidizing atmosphere, other materials such as, for example, zirconium diboride or zirconium nitride doped with either barium oxide or calcium oxide and the like may be used in an inert or non-oxidizing atmosphere.

Most ceramic-type materials that have suitable mechanical characteristics generally do not have suitable electrical characteristics, i.e., for all practical purposes, they are not thermally emissive. For this reason, it is generally necessary to dope an otherwise suitable ceramic or ceramic-type material with a thermally emissive material to provide the proper electrical characteristics. By way of example, a suitable level of thermal emission is of at least the order of ten amperes per square centimeter required in MHD generators and one hundred amperes per square centimeter required in MHD accelerators. As noted previously, zirconium oxide doped with 6.4% calcium oxide will provide satisfactory electrical characteristics.

The metallic portion of the electrode may, for example, be either copper with a stainless steel cap to achieve high temperature and/or continuous operation and minimum erosion or, alternately, the metallic portion of the electrode may be all copper for low temperature and/or intermittent operation. As compared to an electrode having a metallic portion composed of solid copper or the like, the use of a stainless steel cap permits the existence of a higher temperature at the electrode walls of the duct and therefore a higher temperature at the boundary layer which in turn increases the efficiency of the MHD devices. Further, a stainless steel cap provides greater erosion resistance than would be provided by copper or the like. The electrode drop as measured between the boundary layer and the exposed surface of two opposed electrodes constructed in accordance with the present invention was less than five volts. Cooling of the metallic portion of the electrode is required for continuous operation of long duration and particularly when the electrically-conductive gas is at about 5000° F. as is the case for a suitable electrically-conductive gas comprised of products of combustion. Further, cooling of the metallic portion of the electrode decreases the possibility of arcing due to the Hall effect as noted earlier.

Typically, with cooling, the exposed surface of the electron emissive material may be at a temperature of 4000° F. while the metallic portion of the electrode is at a temperature of only 500° F.

For the minimum effect of friction, the electrode should be oriented such that elongated grooves or recesses are normal to the direction of gas flow to prevent the electron emissive material from being driven out of the recesses. The electron emissive material may be conveniently deposited in the grooves or recesses by the plasma spraying technique. Rectangular-shaped grooves or recesses have been used and are described herein because of their simplicity and the ease with which they can be formed. However, it is to be understood that the present invention is not limited in this respect as many types of cavities may be used to retain the electron emissive material. A suitable depth and width of the recesses are essentially determined by the thermal characteristics of the electron emissive material. For the case of ceramic-type materials, which are essentially poor heat conductors, recesses that are too deep or too wide will result in nonuniform heating of the surface of the material and hence, nonuniform conductive and electron emissive characteristics. The depth and width of the recesses are advantageously selected in a manner to provide a uniform surface temperature of the electron emissive material which results in maximum conductivity and uniform electron emission for the particular material that is selected. The optimum temperature will of course be determined by the composition of the material that is selected. As noted previously, by way of example, a surface temperature of 4000° F. for the electron emissive material has been found to be satisfactory.

As will now be evident, the electron emissive material performs two important functions, the first of which is to provide a stable high temperature electron emitting surface and the second of which is to reduce the heat loss through the electrode wall. The metallic portion of the electrode functions to support and retain the electron emissive material, to carry away the current with minimum losses, and to reduce arcing.

As noted previously, current flow in the electron emissive material is principally in the high temperature surface region. From the edges of the electron emissive material, the current then flows through the metallic portion of the electrode which may be mounted in conventional manner in any suitable electrically-nonconductive support.

The various features and advantages of the invention are thought to be clear from the foregoing description. Various other features and advantages not specifically enumerated will undoubtedly occur to those versed in the art, as likewise will many variations and modifications of the embodiment of the invention illustrated, all of which may be achieved without departing from the spirit and scope of the invention as defined by the following claims:

1. An electrode for conducting electrical current in an MHD device between a conductor and a hot electrically-conductive gas comprising:

(a) a stainless steel member having at least one recess in one surface which is otherwise substantially smooth; and (b) a heat resistant ceramic filler enriched with an electron emissive material fixedly disposed in said recess, said filler being substantially chemically inactive with substantially all products of combustion, electron emissive at about 2000° F. and substantially electrically nonconductive at temperatures substantially less than 2000° F.

2. An electrode for conducting electrical current in an MHD device between a conductor and a hot electrically-conductive gas having a temperature of about 2000° F. comprising:

(a) a metallic base member having a thermal conductivity of the order of that of copper and having a passage open at both ends for receiving a coolant;

(b) a metallic end member having a degree of erosion resistance of the order of that of stainless steel bonded to and in electrical communication with said base member, said end member having at least one recess in its surface oppositely disposed from base member; and (c) a substantially nonoxidizable ceramic filler having a low coefficient of expansion enriched with an electron emissive material fixedly disposed in said recesses, said filler being electrically conductive at about 2000° F. and substantially electrically non-conductive at a temperature substantially less than 2000° F.

3. The combination as defined in claim 2 wherein said base member is copper and said end member is stainless steel.

4. The combination as defined in claim 2 wherein said filler is zirconium oxide and said emissive material is calcium oxide.

5. The combination as defined in claim 2 wherein said surface of said end member is generally rectangular in shape and said recess is an elongated groove extending in the length direction of said surface, said grooves comprising a substantial portion of the area of said surface.

6. In an MHD device having a duct for conveying an electrically-conductive gas at a temperature of at least about 2000° F. through a magnetic field, oppositely disposed electrodes carried in the walls of said duct comprising:

(a) a metallic base member having a thermal conductivity of the order of that of copper and having a passage open at both ends for receiving a coolant;

(b) a metallic end member having a degree of erosion resistance of the order of that of stainless steel bonded to and in electrical communication with said base member, said end member having a plurality of recesses in its surface oppositely disposed from base member, said recesses comprising a substantial portion of said surface; and (c) a ceramic filler enriched with an electron emissive material fixedly disposed in said recesses, said ceramic having a low coefficient of expansion and being substantially chemically inactive with said hot electrically-conductive gas, said electron emissive material in said filler providing a level of thermal emission of the order of at least about ten amperes per square centimeter at the temperature of said gas.

7. An electrode for conducting electrical current in an MHD device between a conductor and a hot electrically-conductive gas having a temperature of about 2000° F. comprising:

(a) an elongated and relatively narrow electrically conductive metallic member having at least one recess extending substantially the length of said member; and (b) a heat resistant filler material electrically conductive at the operating temperature of said gas and an insulator at a temperature substantially less than the said operating temperature of said gas fixedly disposed in said recess and exposed to said gas.

8. An electrode for conducting electrical current in an MHD device between a conductor and a hot electrically-conductive gas having a temperature of about 2000° F. comprising:

(a) an elongated and relatively narrow electrically conductive metallic member having at least one recess extending substantially the length of said member; and (b) a heat resistant filler material electrically conductive at the operating temperature of said gas and an insulator at a temperature substantially less than the said operating temperature of said gas fixedly disposed in said recess, said material and at least one portion of said member being exposed to said gas.

9. In an MHD device having a duct for conveying an electrically-conductive gas at a temperature of about 2000° F. through a magnetic field, electrodes electrically insulated one from another and carried by at least one wall of said duct comprising:

(a) an elongated and relatively narrow electrically conductive metallic member forming a part of said duct and having at least one recess extending substantially the length of said member and normal to the direction of gas flow; and (b) a heat resistant nonmetallic filler material electrically conductive at the operating temperature of said gas and an insulator at a temperature substantially less than said operating temperature of said gas fixedly disposed in said recess and exposed to said gas.

10. In an MHD device having a duct for conveying an electrically-conductive gas at a temperature of about 2000° F. through a magnetic field, electrodes electrically insulated one from another and carried by at least one wall of said duct comprising:

(a) an elongated and relatively narrow electrically conductive metallic member forming a part of said duct and having at least one recess extending substantially the length of said member and normal to the direction of gas flow; and (b) a heat resistant nonmetallic filler material electrically conductive at the operating temperature of said gas and an insulator at a temperature substantially less than said operating temperature of said gas fixedly disposed in said recess, said material and at least one portion of said member being exposed to said gas.

11. The combination as defined in claim 10 wherein said metallic member is provided with a passage adjacent said recess and open at both ends for receiving a coolant.

12. The combination as defined in claim 11 wherein said filler is a ceramic having a low coefficient of expansion and is substantially chemically inactive with said gas.

13. The combination as defined in claim 12 wherein said filler is enriched with an electron emissive material for providing at least about ten amperes per square centimeter at the temperature of said gas.

References Cited by the Examiner

UNITED STATES PATENTS

| | | | |
|---|---|---|---|
| 2,375,808 | 5/1945 | Miller | 313—346 |
| 2,438,195 | 3/1948 | Steele | 313—32 |
| 2,459,841 | 1/1949 | Rouse | 313—346 |

OTHER REFERENCES

Publication: Engineering Aspects of Magnetohydrodynamics; Proceedings of the Second Symposium at Philadelphia, March, 1961; edited by Mannal and Mather, pages 25 to 27, 60, 155, 201, 202, 340 to 342.

MAX L. LEVY, *Primary Examiner.*

D. X. SLINEY, MILTON O. HIRSHFIELD, *Examiners.*